United States Patent
Hizaki

(10) Patent No.: US 12,230,070 B2
(45) Date of Patent: Feb. 18, 2025

(54) INFORMATION PROCESSING APPARATUS, VEHICLE SYSTEM, INFORMATION PROCESSING METHOD AND STORAGE MEDIUM

(71) Applicant: TOYOTA JIDOSHA KABUSHIKI KAISHA, Toyota (JP)

(72) Inventor: Masaya Hizaki, Nagareyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 17/838,680

(22) Filed: Jun. 13, 2022

(65) Prior Publication Data

US 2022/0398874 A1 Dec. 15, 2022

(30) Foreign Application Priority Data

Jun. 15, 2021 (JP) ................. 2021-099560

(51) Int. Cl.
*G07C 5/00* (2006.01)
*G07C 5/08* (2006.01)

(52) U.S. Cl.
CPC ........... *G07C 5/008* (2013.01); *G07C 5/0816* (2013.01); *G07C 5/0841* (2013.01)

(58) Field of Classification Search
CPC .... G07C 5/008; G07C 5/0816; G07C 5/0841; B60W 2540/06; B60W 2556/45; B60W 2556/50; B60W 30/192; B60W 2556/10; H04L 67/125; H04L 67/12
See application file for complete search history.

(56) References Cited

U.S. PATENT DOCUMENTS

| | | | |
|---|---|---|---|
| 2015/0169018 A1* | 6/2015 | Rogo | ........................ G06F 1/26 701/2 |
| 2015/0226146 A1* | 8/2015 | Elwart | ................ F02N 11/0818 701/112 |
| 2018/0308293 A1* | 10/2018 | DeCia | .................... H04N 7/181 |
| 2020/0223376 A1* | 7/2020 | Tillman | ................ B60R 16/023 |
| 2021/0061194 A1* | 3/2021 | Sugawa | .................. H04L 12/66 |
| 2021/0114605 A1* | 4/2021 | Kuang | ................ B60W 30/192 |
| 2021/0185495 A1* | 6/2021 | Shin | .................... H04L 12/4604 |

FOREIGN PATENT DOCUMENTS

| | | |
|---|---|---|
| CN | 108725353 A | 11/2018 |
| JP | WO2006/027843 A1 | 3/2006 |
| JP | 2006-172844 A | 6/2006 |
| JP | 2007-118665 A | 5/2007 |
| JP | 2018-061190 A | 4/2018 |
| JP | 2018-074204 A | 5/2018 |

* cited by examiner

*Primary Examiner* — Jelani A Smith
*Assistant Examiner* — Alyssa Rorie
(74) *Attorney, Agent, or Firm* — Sughrue Mion, PLLC

(57) ABSTRACT

An information processing apparatus comprises a controller configured to: detect that shutdown operation that is operation of stopping a traveling system is performed for a predetermined vehicle; and determine an operation mode after the shutdown operation for at least one of a plurality of electronic control units provided at the vehicle based on a first location that is a location at which the shutdown operation is performed.

8 Claims, 17 Drawing Sheets

| MODE LIST | ECU200A (SECURITY) | ECU200B (REMOTE CONTROL) | ECU200C (AUTONOMOUS PARKING) | ECU200D (COORDINATION WITH SMART HOME) | ... |
|---|---|---|---|---|---|
| | NORMAL | NORMAL | NORMAL | SLEEP | ... |

FIG. 4

MODE LIST

| TYPE OF PARKING LOCATION | ECU200A (SECURITY) | ECU200B (REMOTE CONTROL) | ECU200C (AUTONOMOUS PARKING) | ECU200D (COORDINATION WITH SMART HOME) |
|---|---|---|---|---|
| HOME | NORMAL | NORMAL | NORMAL | NORMAL |
| OFFICE | NORMAL | NORMAL | NORMAL | SLEEP |
| ... | NORMAL | NORMAL | SLEEP | SLEEP |
| ... | ... | ... | ... | ... |

OPERATION RESULT DATA

| DATE AND TIME | PARKING LOCATION | ECU | EVENT 1 | EVENT 2 | EXPLANATION |
|---|---|---|---|---|---|
| ... | ... | ECU200A | COMMUNICATION REQUEST OCCURS | COMMUNICATION TIMES OUT | ALTHOUGH COMMUNICATION REQUEST OCCURS, COMMUNICATION DESTINATION DOES NOT RESPOND |
| ... | ... | ECU200B | NONE | NONE | EVENT DOES NOT OCCUR (NOT USED) |
| ... | ... | ECU200C | COMMUNICATION REQUEST OCCURS | COMMUNICATION OCCURS | COMMUNICATION REQUEST OCCURS AND COMMUNICATION IS ACTUALLY PERFORMED |
| ... | ... | ... | ... | ... | ... |

MODE LIST

| ECU | MODE |
|---|---|
| ECU200A | SLEEP |
| ECU200B | SLEEP |
| ECU200C | NORMAL |
| ... | |

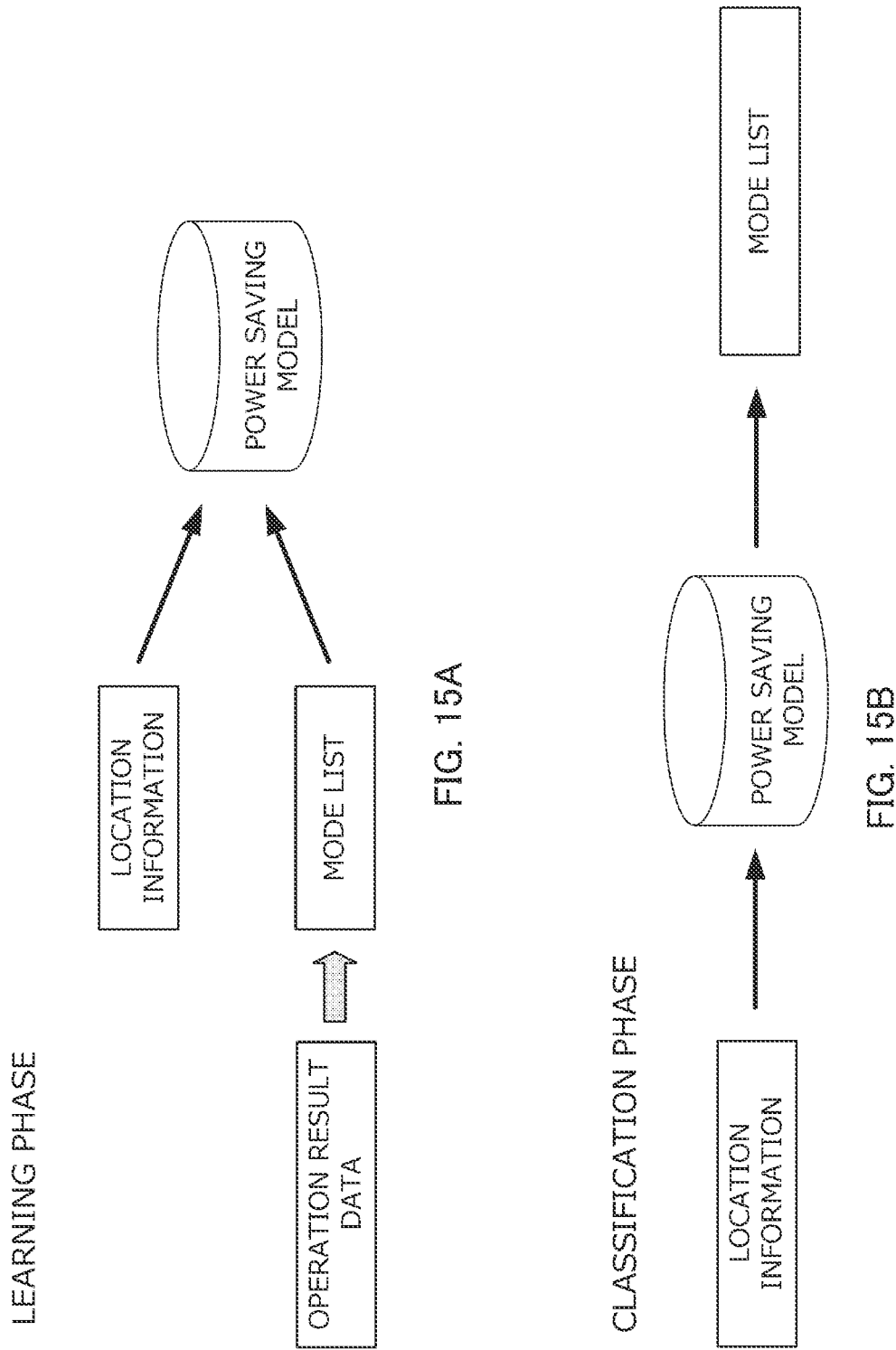

INFORMATION PROCESSING APPARATUS, VEHICLE SYSTEM, INFORMATION PROCESSING METHOD AND STORAGE MEDIUM

CROSS REFERENCE TO THE RELATED APPLICATION

This application claims the benefit of Japanese Patent Application No. 2021-099560, filed on Jun. 15, 2021, which is hereby incorporated by reference herein in its entirety.

BACKGROUND

Technical Field

The present disclosure relates to control of a vehicle.

Description of the Related Art

A system in which an in-vehicle computer performs wireless communication is in widespread use.

Concerning this, for example, Japanese Patent Laid-Open No. 2018-061190 discloses a disclosure related to an in-vehicle communication module that performs communication with a server outside a vehicle.

SUMMARY

The present disclosure is directed to reducing power consumption of a vehicle.

The present disclosure in its one aspect provides an information processing apparatus comprising a controller configured to: detect that shutdown operation that is operation of stopping a traveling system is performed for a predetermined vehicle; and determine an operation mode after the shutdown operation for at least one of a plurality of electronic control units provided at the vehicle based on a first location that is a location at which the shutdown operation is performed.

The present disclosure in its another aspect provides a vehicle system comprising a vehicle and a server apparatus, the server apparatus comprising a first controller configured to generate first data that is data for determining an operation mode of each of a plurality of electronic control units provided at the vehicle based on location information of a first location that is a location at which shutdown operation that is operation of stopping a traveling system of the vehicle is performed, and the vehicle comprising a second controller configured to transmit the location information of the first location to the server apparatus, and determine an operation mode after the shutdown operation for each of a plurality of electronic control units provided at the vehicle based on the first data.

The present disclosure in ms another aspect provides an information processing method comprising: a step of detecting that shutdown operation that is operation of stopping a traveling system of a vehicle performed; and a step of determining an operation mode after the shutdown operation for at least one of a plurality of electronic control units provided at the vehicle based on a first location that is a location at which the shutdown ah operation is performed.

According to the present disclosure, it is possible to reduce power consumption of a vehicle,

BRIEF DESCRIPTION OF THE DRAWINGS

FIG. 4 is an example of a mode list stored in the storage;

FIG. 11 is an example of a mode list in the second embodiment;

FIG. 14 is a diagram illustrating a relationship between operation result data and operation modes;

FIG. 15A is a diagram for explaining a power saving model in the third embodiment;

FIG. 15B is a diagram for explaining a power saving model in the third embodiment;

DESCRIPTION OF THE EMBODIMENTS

Figure 1:
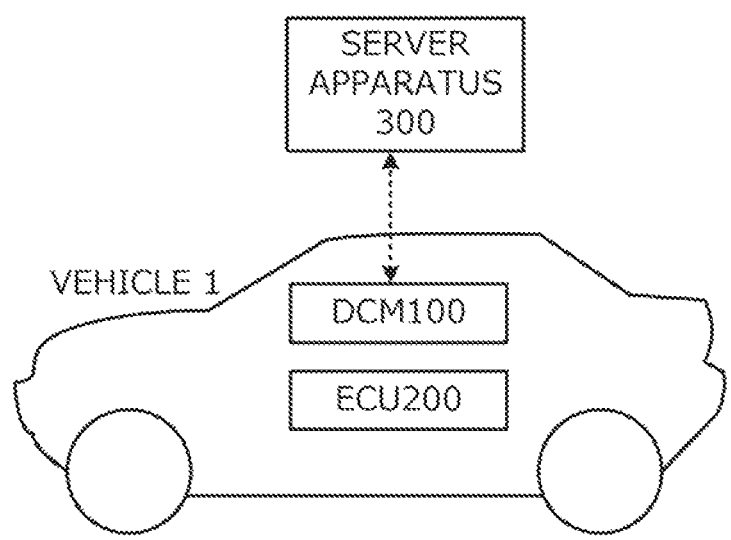
FIG. 1 is a schematic diagram of a vehicle system according to a first embodiment.

An electronic control unit provided at a vehicle typically stops operation at the same time as a traveling system of the vehicle being shut down. However, in accordance with improvement in a vehicle function in recent years, there is an increasing number of electronic control units that continue to stand by also while the vehicle is parked. Examples of such electronic control units can include an electronic control unit that provides a security function, an electronic control unit that provides a remote control function, an electronic control unit that provides a function of coordinating with a smart home, and the like.

However, if the number of electronic control units that continue to stand by while the vehicle is parked increases, power consumption increases, which results in a problem that a burden is placed on a battery of the vehicle.

An information processing apparatus according to the present disclosure solves such a problem.

An information processing apparatus according to one aspect of the present disclosure includes a controller configured to detect that shutdown operation that is operation of stopping a traveling system is performed for a predetermined vehicle, and determine an operation mode after the shutdown operation for at least one of a plurality of electronic control units provided at the vehicle based on a first location that is a location at which the shutdown operation is performed.

The shutdown operation is operation of stopping the traveling system of the vehicle. Examples of the shutdown operation include, for example, operation of turning off an ignition of the vehicle, operation of turning off power for traveling, operation of stopping an engine, operation of stopping hybrid system, and the like.

When the shutdown operation is performed, it means that a state of the vehicle transitions from a state where the vehicle can travel to a state where the vehicle is parked.

The controller determines an operation mode after the shutdown operation (that is, an operation mode after the vehicle starts to be parked) for each of the plurality of electronic control units provided at the vehicle based on a location where the shutdown operation is performed.

Whether or not it is preferable to cause the plurality of electronic control units provided at the vehicle to operate while the vehicle is parked varies depending on the environment.

For example, in a case where the vehicle is parked at a location other than a home of an owner, it is not necessary to cause an electronic control unit that coordinates with a smart home to operate. On the other hand, in a case where the vehicle is parked at a parking space at home, it is preferable to cause the electronic control unit to operate.

Thus, by determining an operation mode of each electronic control unit based on a location where the shutdown operation is performed (that is, a location where the vehicle is parked), unnecessary operation of the electronic control unit can be prevented, so that power consumption can be reduced.

Examples of the operation mode can include, for example, a "sleep mode" and an "operation continuation mode". Note that the operation mode may include other operation modes if the modes relate to power consumption. For example, the operation mode may include a "mode in which a communication amount is reduced than usual", a "mode in which power consumption is reduced than usual", and the like.

Specific embodiments of the present disclosure will be described below based on the drawings. A hardware configuration, a module configuration, a functional configuration, and the like, described in each embodiment are not intended to limit the technical scope of the disclosure unless noted otherwise, First Embodiment Outline of a vehicle system according to a first embodiment will be described with reference to FIG. 1. The vehicle system according to the present embodiment includes a vehicle 1 and a server apparatus 300.

The vehicle 1 is a connected car that has a function of communicating with an external network. The vehicle 1 includes a data communication module (DOM) 100 and an electronic control unit (ECU) 200.

Note that while FIG. 1 illustrates a single ECU 200, the vehicle may include a plurality of ECUs 200.

The DOM 100 is a device that performs wireless communication with an external network. The DOM 100 functions as a gateway for connecting components (hereinafter, vehicle components) provided at the vehicle 1 to the external network. For example, the DOM 100 provides access to the external network, to the ECUs 200 provided at the vehicle 1. This enables the plurality of ECUs 200 mounted on the vehicle to communicate with an external apparatus connected to the network via the DOM 100.

The server apparatus 300 is an apparatus that provides information to the vehicle 1. In the present embodiment, the server apparatus 300 provides information for determining operation modes of the plurality of ECUs 200 while the vehicle 1 is parked, to the vehicle 1. Note that the server apparatus 300 may also serve as an apparatus that provides other information (such as, for example, traffic information and information related to infotainment) to the vehicle 1.

Figure 2:
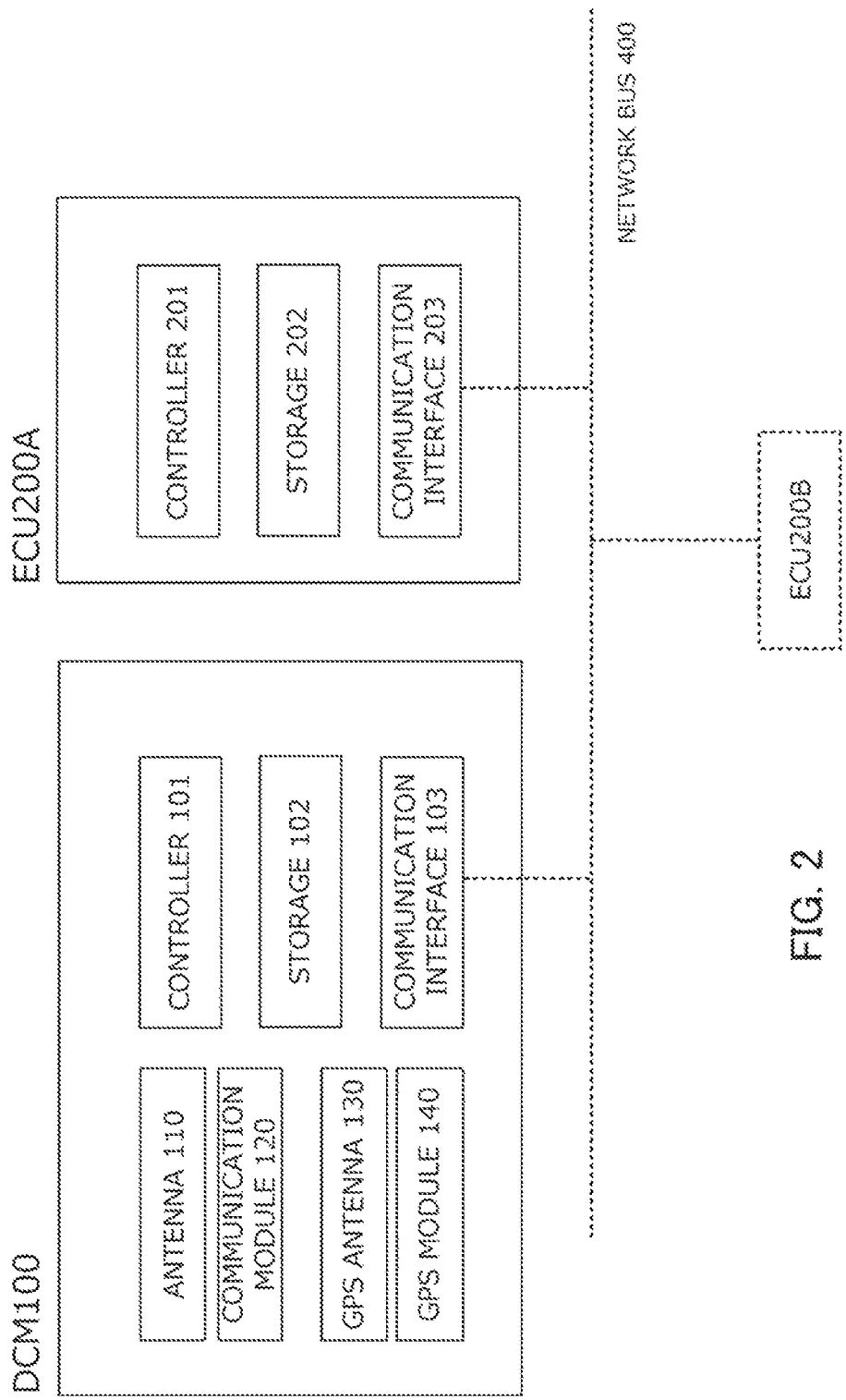
FIG. 2 is a diagram for explaining components of a vehicle 1 according to the first embodiment.

FIG. 2 is a diagram for explaining components of the vehicle 1 according to the present embodiment. The vehicle 1 according to the present embodiment includes the DOM 100, and a plurality of ECUs 200A, 200B, ... (hereinafter, collectively referred to as an ECU 200).

The ECU 200 may include a plurality of ECUs that control different vehicle components. Examples of the plurality of ECUs can include, for example, a body ECU, an engine ECU, a hybrid ECU, a power train ECU, and the like. Further, the ECU 200 may be divided on a function basis. For example, the ECU 200 may be divided into an ECU that executes a security function, an ECU that executes an autonomous parking function, an ECU that executes a remote control function, and an ECU that executes an infotainment function.

The DOM 100 includes an antenna 110, communication module 120, a GPO antenna 130, a GPO module 140, a controller 101, a storage 102, and a communication interface 103.

The antenna 110 is an antenna element that inputs/outputs a wireless signal. In the present embodiment, the antenna 110 complies with mobile communication (for example, mobile communication such as 3G, LTE and 5G). Note that the antenna 110 may include a plurality of physical antennas. For example, in a case where mobile communication utilizing a high-frequency radio wave such as a microwave and a millimeter wave is performed, a plurality of antennas may be arranged in a dispersed manner to achieve stable communication.

The communication module 120 is a communication module for performing mobile communication.

The GPS antenna 130 is an antenna that receives a positioning signal transmitted from a navigation satellite (also referred to as a GNUS satellite).

The GPS module 140 is a module that calculates location information based on a signal received by the GPS antenna 130.

The controller 101 is an arithmetic unit that implements various kinds of functions of the DOM 100 by executing a predetermined program. The controller 101 may be, for example, implemented by a CPU, or the like.

The storage 102 is a memory device including a main memory and an auxiliary memory. In the auxiliary memory, an operating system. (OS), various kinds of programs, various kinds of tables, and the like, are stored, and various functions that match predetermined purposes as will be described later can be achieved by the programs stored therein being loaded to the main memory and executed.

The controller 101 executes functions of mediating communication to be performed between the external network and components (vehicle components) provided at the vehicle 1. For example, in a case where a certain vehicle component requires communication with the external network, the controller 101 executes a function of relaying data transmitted from the vehicle component to the external network. Further, the controller 101 executes a function of receiving data transmitted from the external network and transferring the data to an appropriate vehicle component.

Still further, the controller 101 can execute functions specific to the own apparatus. For example, the controller 101 is configured to be able to execute a monitoring function and a call function of a security system and can make a security notification, an emergency notification, or the like, based on a trigger occurring inside the vehicle.

Further, in a case where the vehicle is parked, the controller 101 determines operation modes of a plurality of ECUs 200 based on the location and executes control of switching the operation modes while the vehicle is parked. A detailed method will be described later.

The communication interface 103 is an interface unit for connecting the DON 100 to an in-vehicle network. In the present embodiment, a plurality of vehicle components including the electronic control, unit (ECU 200) are connected to each other via a bus 400 of the in-vehicle network. Examples of standards of the in-vehicle network can include, for example, a controller area network (CAN). Note that in a case where the in-vehicle network utilizes a plurality of standards, the communication interface 103 may include a plurality of interface devices in accordance with standards of communication destinations. Examples of the standards can also include, for example, Ethernet (registered trademark) as well as the CAN.

Figure 3:
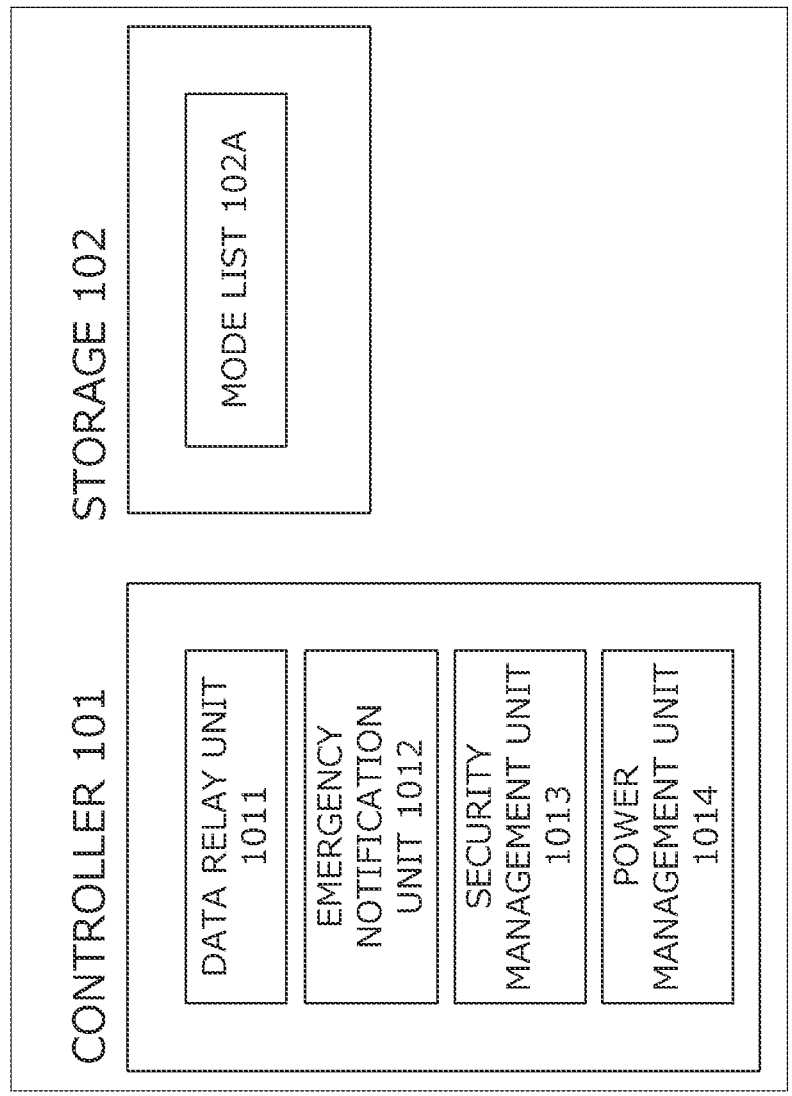
FIG. 3 is a schematic diagram for explaining functional modules of a controller and data stored in a storage.

Functions to be executed by the controller 101 will be described next. FIG. 3 is a schematic diagram for explaining functional modules of the controller 101 and data stored in the storage 102. The functional modules of the controller 101 can be implemented by the controller 101 executing programs stored in storage such as a ROM.

A data relay unit 1011 relays data to be transmitted/received between vehicle components. For example, the data relay unit 1011 performs processing of receiving a message sent by a first device connected to the in-vehicle network and transferring the message to a second device connected co the in-vehicle network as necessary. The first device and the second device may be ECUs 200 or may be other vehicle components.

Further, in a case where the data relay unit 1011 receives a message addressed to the external network from a vehicle component, the data relay unit 1011 relays the message to the external network. Further, the data relay unit 1011 receives data transmitted from the external network and transfers the data to an appropriate vehicle component.

An emergency notification unit 1012 makes an emergency notification to an operator outside the vehicle in a case where an abnormal situation occurs in the vehicle 1. Examples of the abnormal situation can include occurrence of a traffic accident and a vehicle failure. The emergency notification unit 1012, for example, starts connection to the operator so that passengers of the vehicle can talk with the operator in a case where a predetermined trigger such as depression of a call button provided inside the vehicle and expansion of an air bag occurs. Note that upon emergency notification, the emergency notification unit 1012 may transmit the location information of the vehicle to the operator. In this case, the emergency notification unit 1012 may acquire the location information from the GPS module 140.

A security management unit. 1013 performs security monitoring processing. The security management unit 1013, for example, detects that the vehicle is unlocked through a procedure that is not a normal procedure, based on data received from the ECU 200 that controls an electronic lock of the vehicle and transmits a security notification to a predetermined apparatus. Note that the security notification may include the location information of the vehicle. In this case, the security management unit 1013 may acquire the location information from the GPS module 140. In a case where the security management unit 1013 determines that a problem occurs in security of the vehicle, the security management unit 1013 may acquire the location information and may periodically transmit the acquired location information to an external apparatus designated in advance.

A power management unit 1014 performs control regarding power saving by determining operation modes of the plurality of ECUs 200 provided at the vehicle 1. Specifically, in a case where the vehicle 1 is parked, the power management unit 1014 acquires a location at which the vehicle 1 is parked (hereinafter, referred to as a parking location). Further, the power management unit 1014 determines an operation mode of each of the plurality of ECUs 200 based on the parking location and switches the operation modes of the plurality of ECUs 200.

The operation mode is a mode in which the ECU 200 is caused to operate and includes, for example, a "normal mode", a "sleep mode", a "power saving mode", and the like. The power saving mode may be divided into a mode in which an execution frequency of processing to be performed by the ECU 200 is reduced, a mode in which an execution period of the processing is reduced, a mode in which a frequency of external communication is reduced, a mode in which a standby current is reduced, and the like.

By switching the operation modes of the plurality of ECUs 200 respectively to appropriate operation modes, overall power consumption of the vehicle system can be reduced. For example, in a case where there is an ECU 200 that externally communicates at intervals of 30 seconds in normal operation, power consumption can be reduced by changing the interval of communication to five minutes.

In the present embodiment, "normal" and "sleep" modes will be described as examples of the operation mode.

The storage 102 stores a mode list 102A.

The mode list 102A is a list in which the operation modes of the plurality of ECUs 200 provided at the vehicle 1 are recorded. FIG. 4 illustrates an example of the mode list 102A.

The mode list 102A is data that defines the operation modes of the plurality of ECUs 200 in a case where the vehicle 1 is parked at a specific location.

In the present embodiment, in a case where the vehicle 1 is parked at a specific location (hereinafter, a specific location), the power management unit 1014 changes the operation modes of the plurality of ECUs 200 provided at the vehicle 1 in accordance with the mode list 102A. In a case where the vehicle 1 is parked at a location other than the specific location, the plurality of ECUs 200 provided at the vehicle 1 perform normal operation.

Returning to FIG. 2, the ECU 200 will be described.

The ECU 200 is an electronic control unit that controls components provided at the vehicle 1. The vehicle 1 may include a plurality of ECUs 200. The plurality of ECUs 200, for example, respectively control components of different systems such as an engine system, an electronic equipment system and a power train system. The ECU 200 has a function of generating a specified message and periodically transmitting/receiving the message via the in-vehicle network.

Further, the ECU 200 can provide a predetermined service by communicating with the external network via the DCM 100. Examples of the predetermined service can include, for example, a remote service (for example, a remote air conditioning service), a security monitoring service, a service of coordinating with a smart home, an autonomous parking service (a service of autonomously traveling between a parking slot and an entrance of a building), and the like.

Further, the ECU 200 may control an in-vehicle device (for example, a car navigation device) that provides information to passengers of the vehicle. The in-vehicle device is a device that provides information to passengers of the vehicle and is also called a car navigation system, an infotainment system or a head unit. By this configuration, navigation and entertainment can be provided to passengers of the vehicle. Further, the ECU 200 may download traffic information, road map data, music, a moving image, and the like, via a home network.

The ECU 200 can be constituted as a computer including a processor such as a CPU and a CPU, a main memory such as a RAM and a ROM, and an auxiliary memory such as an EPROM, a disk drive and a removable medium in a similar manner to the DOM 100.

The ECU 200 includes a controller 201, a storage 202 and a communication interface 203.

The controller 201 is an arithmetic unit (processor) that implements various kinds of functions of the ECU 200 by executing a predetermined program. The storage 202 is a memory device including a main memory and an auxiliary memory.

The communication interface 203 is an interface that connects the ECU 200 to the in-vehicle network (CAN bus). The communication interface 203 executes processing of transmitting a message in a predetermined format generated by the controller 201 to the CAN bus and processing of transmitting a message received from the CAN bus to the controller 201.

A network bus 400 is a communication bus that constitutes the in-vehicle network. Note that while one bus is illustrated in the present example, the vehicle 1 may include two or more communication buses. A plurality of communication buses may be connected to each other by the DOM 100 or a gateway that puts the plurality of communication buses together.

Figure 5:
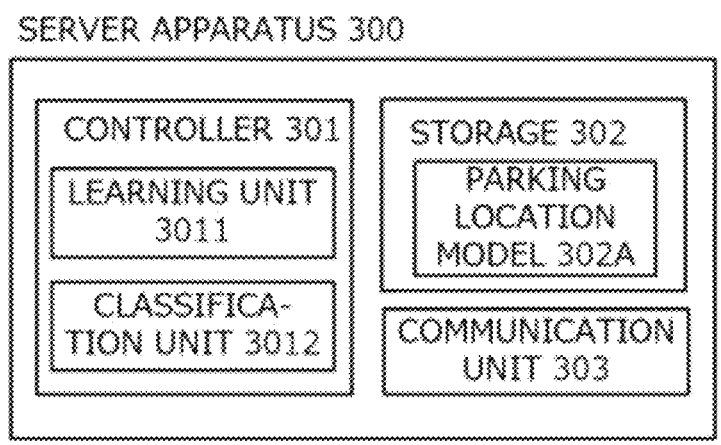
FIG. 5 is a schematic diagram of a server apparatus in the first embodiment.

The server apparatus 300 will be described next. FIG. 5 is a schematic diagram of the server apparatus 300 in the first embodiment.

The server apparatus 300 is an apparatus that classifies a location at which the vehicle 1 is parked (parking location) into a predetermined class.

In the first embodiment, the server apparatus 300 determines whether or not the location at which the vehicle 1 is parked (parking location) is a specific location as a classification result. In the present embodiment, the specific location is a location at which the vehicle 1 has been parked for the longest period among locations at which the vehicle 1 has been parked in the past. The specific location can be estimated as a location (for example, a parking space at home) corresponding to a base location of use of the vehicle 1 (for example, a home of the owner).

The server apparatus 300 stores a machine learning model. (parking location model 302) that has learned a relationship between parking locations and parking periods, and the server apparatus 300 determines whether or not the parking location is the specific location using data output by the model.

The server apparatus 300 can be constituted with a general-purpose computer in other words, the server apparatus 300 can be constituted as a computer including a processor such as a CPU and a CPU, a main memory such as a RAM and a ROM, and an auxiliary memory such as an EPROM, a hard disk drive and a removable medium.

The server apparatus 300 includes a controller 301, a storage 302 and a communication unit 303.

The controller 301 is an arithmetic device that manages control to be performed by the server apparatus 300. The controller 301 can be implemented by an arithmetic processing device such as a CPU.

The controller 301 includes two functional modules of a learning unit 3011 and a classification unit 3012. Each functional module may be implemented by a stored program being executed by the CPU.

Figure 6:
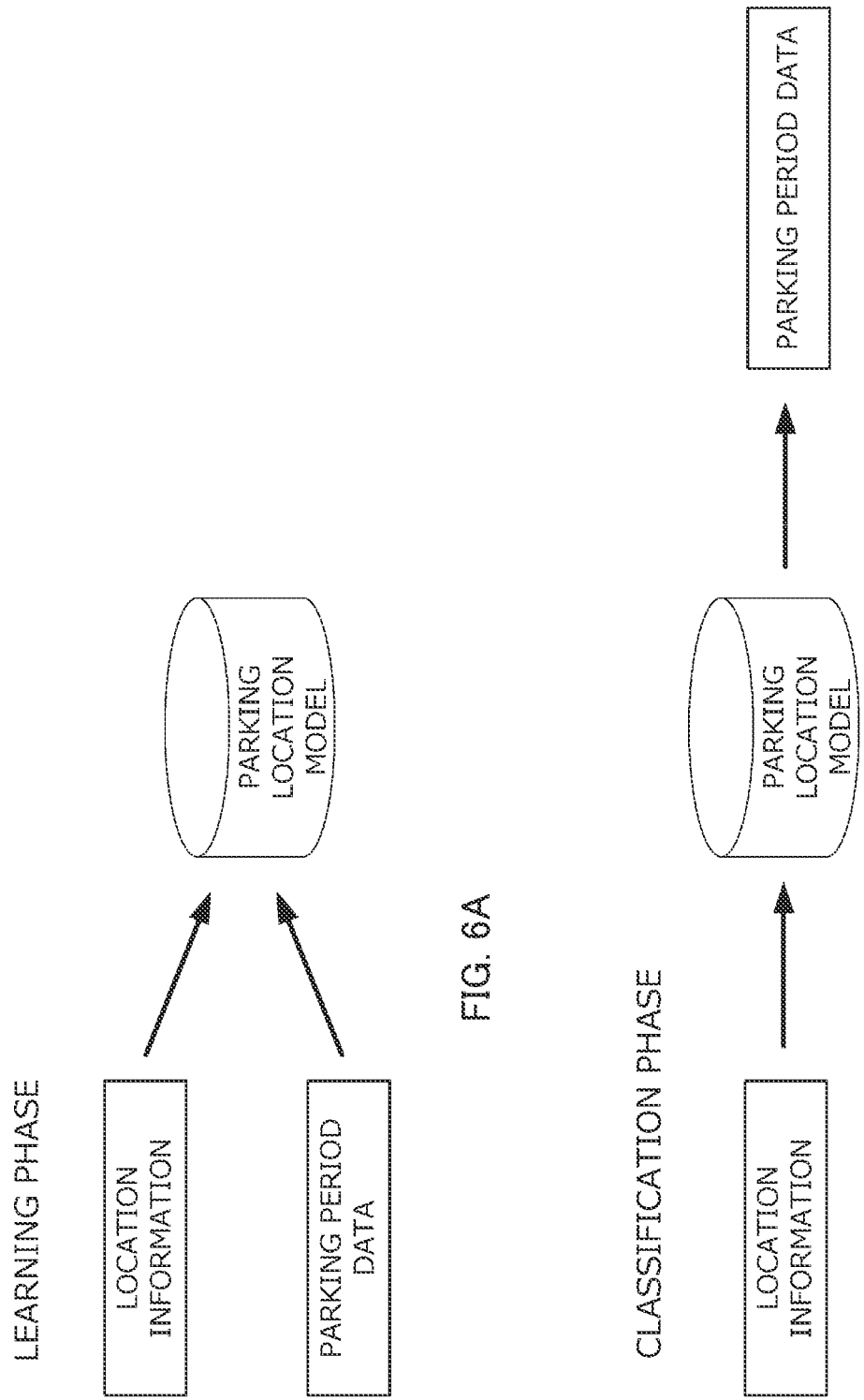
FIG. 6A is a diagram for explaining machine learning in the first embodiment.
FIG. 6B is a diagram for explaining machine learning in the first embodiment.

The learning unit 3011 executes learning of the machine learning model (parking location model 302A) for classifying the parking location. FIGS. 6A and 6B are diagrams for explaining machine learning.

The learning unit 3011 executes a learning phase. Specifically, the learning unit 3011 learns the parking location model 302A based on location information corresponding to the parking location, data indicating a parking period (parking period data) at the parking location, received from the vehicle 1. By this configuration, a machine learning model that receives input of location information of a parking location and outputs an estimated parking period at the parking location, can be obtained. Note that the learning phase is executed in advance at a predetermined timing.

Note that the par location model 302A is constructed for each of a plurality of vehicles I managed by the server apparatus 300.

The classification unit 3012 executes a classification phase. Specifically, the classification unit 3012 inputs the location information received from the vehicle 1 (that is, the location information corresponding to the parking location) to the parking location model 302A and acquires parking period data. The parking period data includes an estimated value of a parking period at the parking location. The parking period data may include data representing rank order in the whole. The classification unit 3012 determines whether or not the parking location is the specific location based on the parking period data and transmits the result to the vehicle 1.

The storage 302 includes a main memory and an auxiliary memory. The main memory is a memory in which a program to be executed by the controller 301 and data to be utilized by the control program are deployed. The auxiliary memory is a device in which a program to be executed at the controller 301 and data to be utilized by the control program (including the parking location model 302A described above) are stored.

The communication unit 303 is a communication interface for connecting the server apparatus 300 to the network. The communication unit 303 includes, for example, a network interface board and a wireless communication interface for wireless communication.

Flow of processing to be executed by the components included in the vehicle system according to the present embodiment will be described next.

The processing to be executed by the components included in the vehicle system according to the present embodiment is roughly divided into a phase in which the server apparatus 300 causes the parking location model. 302A to be learned, and a phase in which the operation modes of the ECUs 200 provided at the vehicle 1 are determined using the learned parking location model 302A. The former will be referred to as a first phase, and the latter will be referred to as a second phase.

Figure 7:
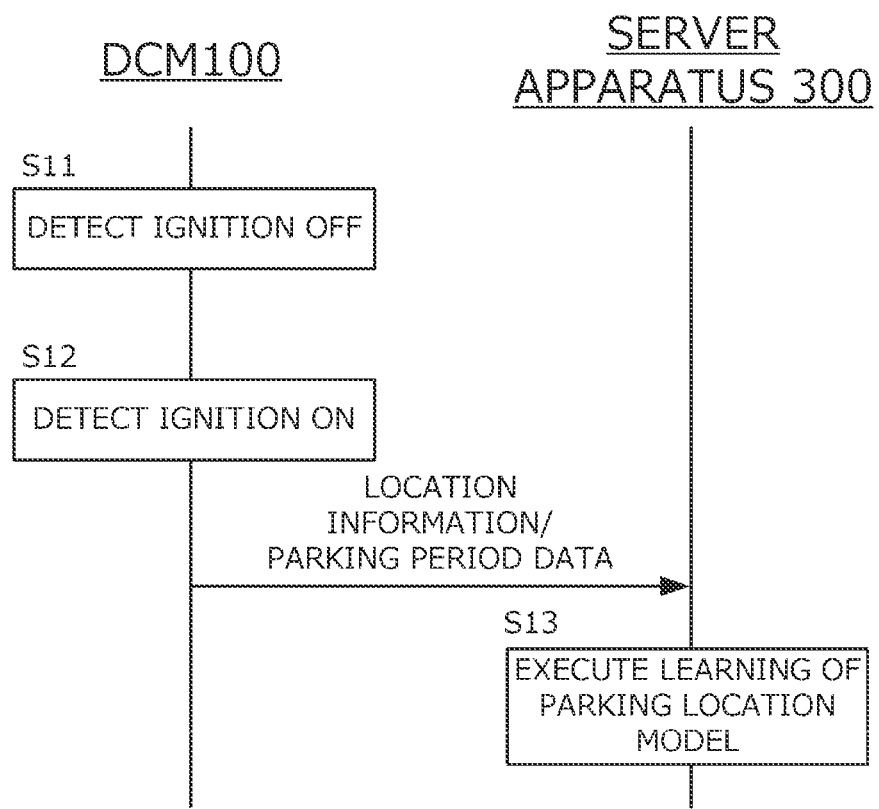
FIG. 7 is a flowchart of a first phase in the first embodiment.

First, the first phase will be described. FIG. 7 is a flowchart of the first phase, that is, processing in which the server apparatus 300 causes the parking location model 302A to be learned.

First, in step S the DCM 100 (power management unit 1014) provided at the vehicle 1 detects that an ignition of the vehicle is turned off. The power management unit 1014 starts counting of a parking period in a case of detecting that the ignition of the vehicle is turned off.

In step S12, the DOM 100 (power management unit 1014) provided at the vehicle 1 detects that the ignition of the vehicle is turned on. The power management unit 1014 stops counting of the parking period in a case of detecting that the ignition of the vehicle is turned on. In the present step, the power management unit 1014 acquires the location information via the GPS module 140 and transmits the acquired location information and data indicating the counted parking period (parking period data) to the server apparatus 300.

In step 313, the server apparatus 300 (learning unit 3011) learns the parking location model 302A using the location information and the parking period data received from the vehicle 1.

Figure 8:
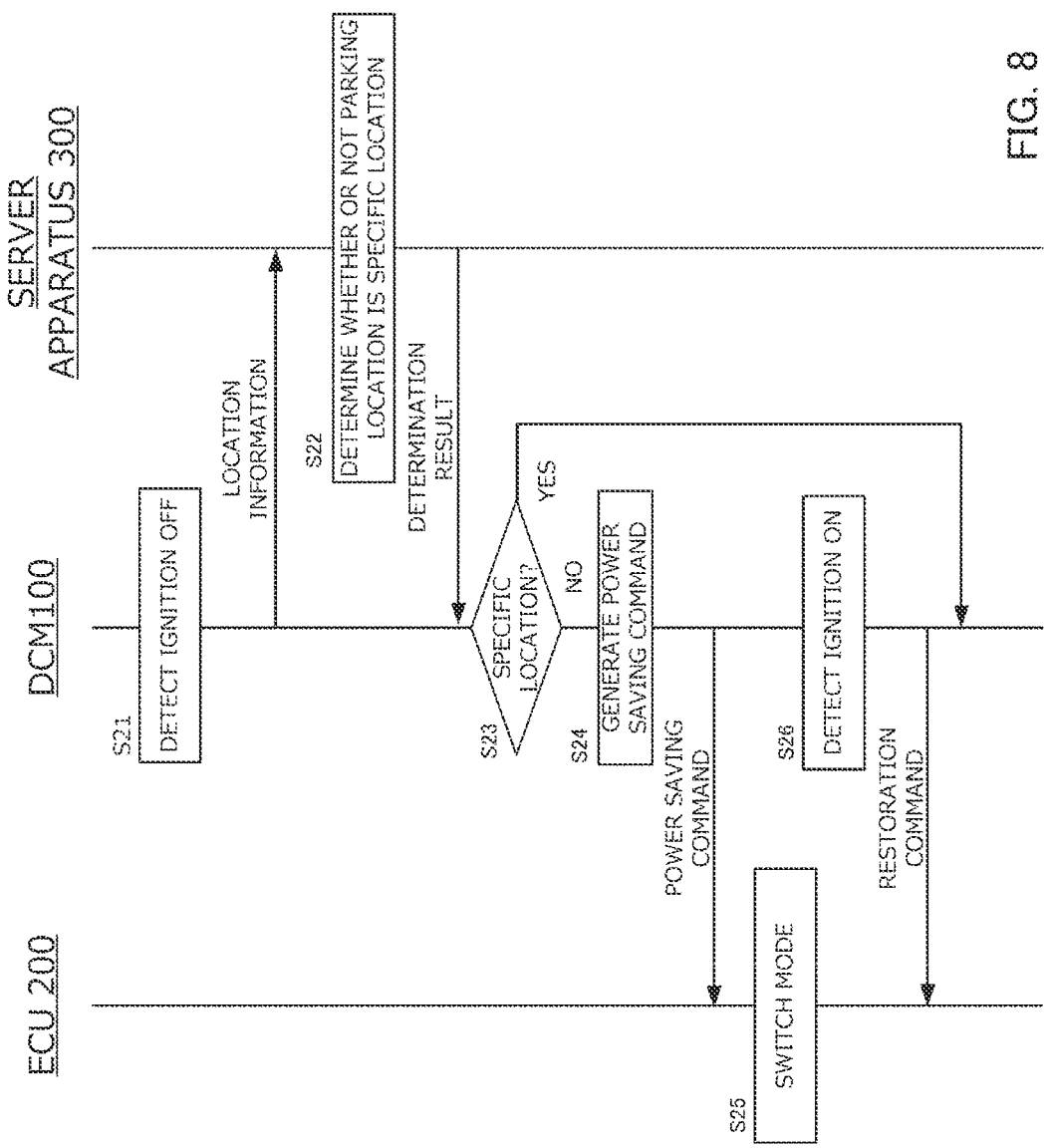
FIG. 8 is a flowchart of a second phase in the first embodiment.

The second phase will be described next. FIG. 8 is a flowchart of the second phase, that is, a phase in which the operation modes of the ECUs 200 provided at the vehicle 1 are determined using the learned parking location model 302A.

First, in step S21, the DON 100 (power management unit 1014) provided at the vehicle 1 detects that the ignition of the vehicle is turned off. In a case where the power management unit 1014 detects that the ignition of the vehicle is turned off, the power management unit 1014 acquires the location information via the GPS module 140 and transmits the location information to the server apparatus 300.

Then, in step S22, the server apparatus 300 (classification unit 3012) acquires the parking period data corresponding to the parking location using the parking location model. Then, the server apparatus 300 determines whether or not the parking location is the specific location (that is, a parking location at which the vehicle has been parked for the longest period among a plurality of parking locations) and transmits the determination result to the DON 100.

Then, in step 323, the power management unit 1014 determines whether or not the parking location is the specific location. In a case where the parking location is not the specific location, the processing proceeds to step 324. In a case where the parking location is the specific location, the processing ends.

In step S24, the power management unit 1014 generates commands for changing the operation modes of the ECUs 200 with reference to the mode list 102A. The power management unit 1014 may generate the commands corresponding to the number of target ECUs 200. The generated commands are transmitted to the target ECUs 200 via the in vehicle network.

For example, in a case where the designated operation mode is "sleep", a command for giving an instruction of sleep is transmitted to the target ECU 200. Further, in a case where a mode for reducing power consumption is designated as the operation mode, a command for giving an instruction of transitioning to the mode is transmitted to the target ECU 200.

In step 225, the ECUs 200 that have received the commands change the operation modes in accordance with the commands.

In the first embodiment, in a case where the parking location is not the specific location, that is, in a case where the vehicle 1 is parked at a place other than home, as illustrated in FIG. 4, the ECU 200 that coordinates with the smart home is put into a sleep state. This enables reduction of unnecessary power consumption by the ECU 200.

In a case where the DOM 100 (power management unit 1014) detects that the ignition of the vehicle is turned on (step 226), the power management unit 1014 generates a command (restoration command) for returning the operation mode of the ECU 200 to the original mode and transmits the command to the target ECU 200.

As described above, in the present embodiment, processing for designating the operation modes of the plurality of ECUs 200 provided at the vehicle 1 based on whether or not the location at which the vehicle a is parked is the specific location is executed. This enables the operation modes of the plurality of ECUs 200 to be changed at a parking location having a predetermined characteristic.

Note that while in the present embodiment, a parking location at which the vehicle 1 has been parked for the longest period (that is, a base location of the vehicle 1) is set as the specific location, whether or not a certain parking location is the specific location may be determined based on other criteria. Further, the determination may be performed using data other than the location information, acquired from the vehicle 1

Further, while in the present embodiment, the operation modes of the ECUs 200 are changed in a case where the parking location is not the specific location, the operation modes of the ECUs 200 may be changed in a case where the parking location is the specific location.

Further, while in the present embodiment, the determination regarding the specific location is performed using the machine learning model, the determination may be performed using other method. Further, result of learning (such as, for example, a list of specific locations) may be transmitted from the server apparatus 300 to the DOM 100, and the determination regarding the specific location may be performed on the vehicle side.

Second Embodiment

In the first embodiment, whether or not to switch the operation modes of the plurality of ECUs 200 is determined based on whether or not the location at which the vehicle 1 is parked is the specific location.

In contrast, a second embodiment is an embodiment in which parking locations are classified into a plurality of classes, and the operation modes of the ECUs 200 are individually designated in accordance with the classification result.

In the second embodiment, the server apparatus 300 classifies parking locations into classes by a plurality of labels defined in advance, such as "home" and "office".

For example, the server apparatus 300 learns that a predetermined parking location is a location corresponding to home of the owner of the vehicle 1 based on the information collected from the vehicle 1. Further, the server apparatus 300 notifies the vehicle 1 that has started to be parked of a label of "home" based on the learning result. This enables the vehicle 1 to recognize that the plurality of ECUs 200 only require to operate in the operation modes corresponding to "home".

Figure 9:
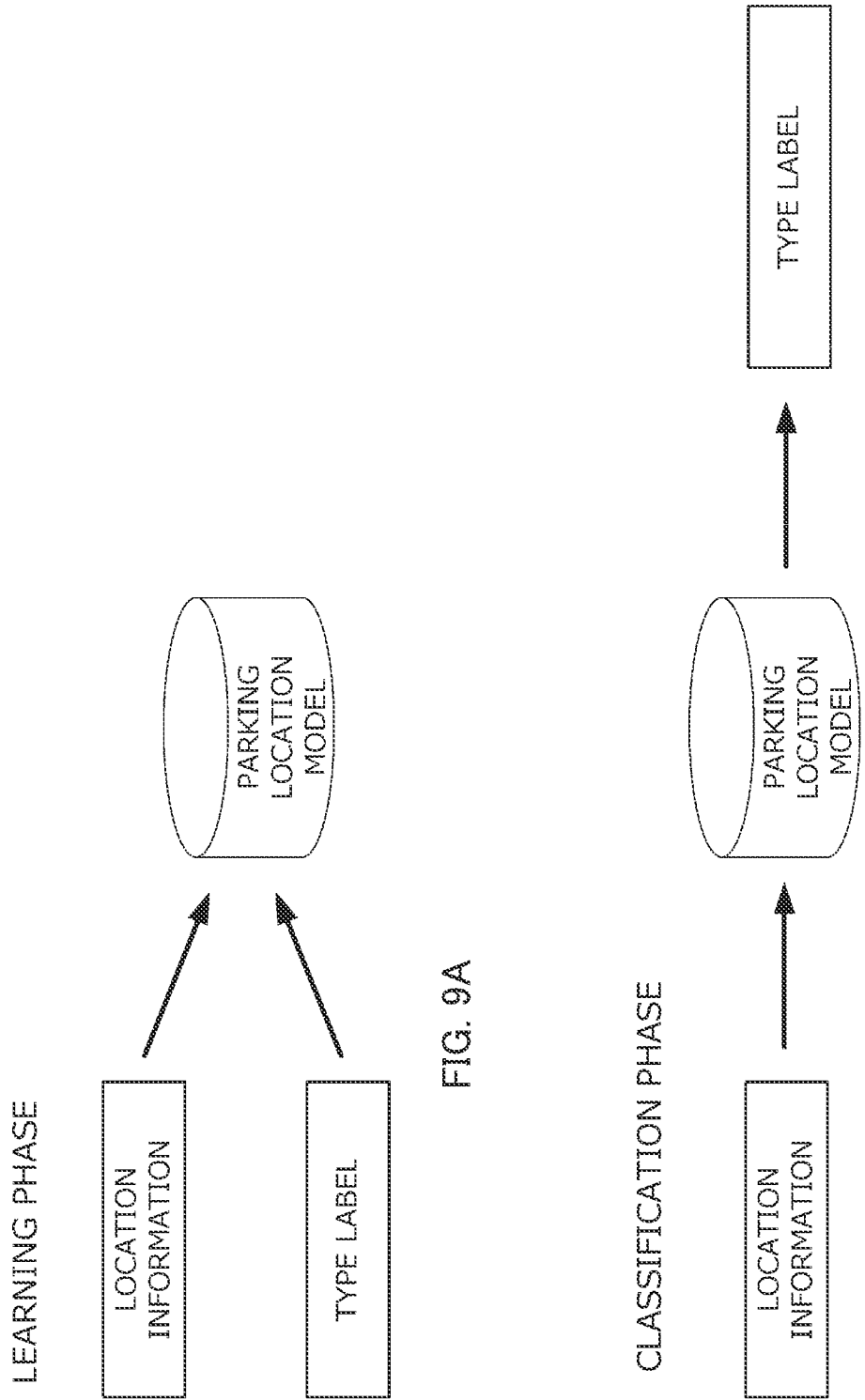
FIG. 9A is a diagram for explaining a parking location model in a second embodiment.
FIG. 9B is a diagram for explaining a parking location model in a second embodiment.

In the second embodiment, the parking location model is a model learned using the location information of the parking location and a label (hereinafter, a type label) representing a type of the parking location. FIGS. 9A and 9B are diagrams for explaining the parking location model in the second embodiment. The parking location model in the second embodiment is different from the parking location model in the first embodiment in that training data is not the parking period data but the type label.

Figure 10:
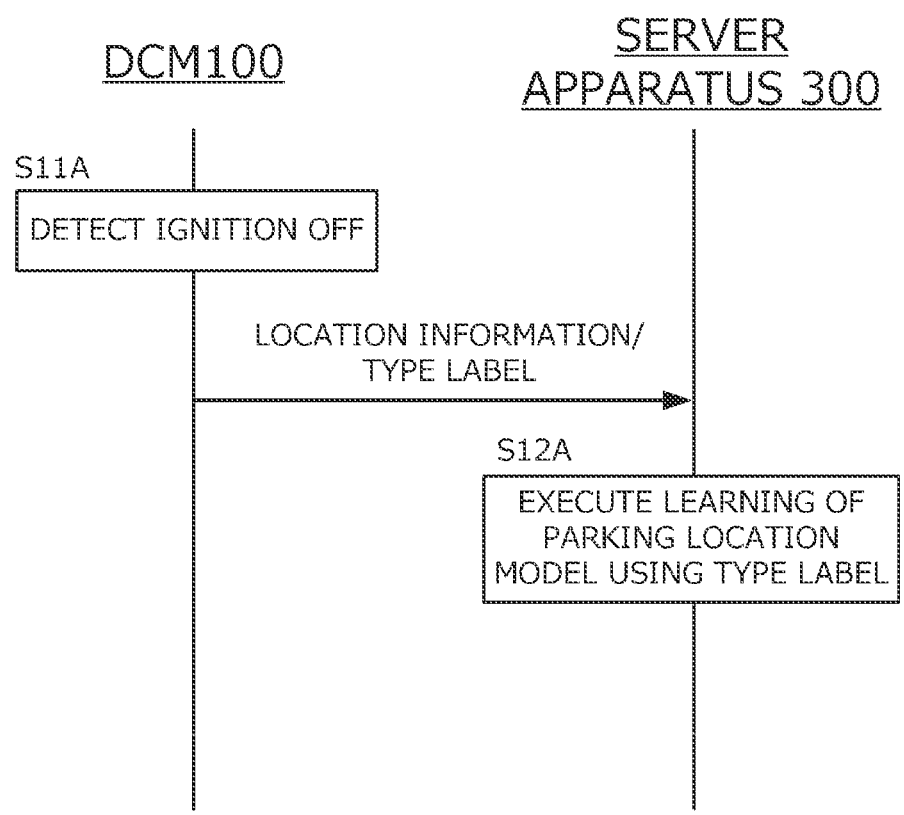
FIG. 10 is a flowchart of a first phase in the second embodiment.

FIG. 10 is a flowchart of a first phase in the second embodiment.

In the second embodiment, the server apparatus 300 (learning unit 3011) learns the parking location model 302A based on the location information corresponding to the parking location and the type label corresponding to the parking location, received from the vehicle 1. By this configuration, a machine learning model that receives input of location information of a parking location and outputs a type label corresponding to the parking location, can be obtained.

In step S11A, the DOM 100 (power management unit 1014) provided at the vehicle 1 detects that the ignition of the vehicle is turned off and acquires the location information of the parking location in a similar manner to the first embodiment.

Further, the power management unit 1014 acquires a type label corresponding to the parking location and transmits the type label to the server apparatus 300 along with the location information.

The type label may be different for each user, such as "home" and "office". In this case, the type label corresponding to the parking location may be acquired from the user. For example, the user may acquire data regarding locations of home and the office from a mobile terminal possessed by the user and may generate type labels using the data.

Further, the type label may be a general label such as a "commercial facility" and a "railway station." In this case, the type labels may be generated using map data, or the like, stored in a navigation device mounted on the vehicle 1.

In step S12A, the learning unit 3011 learns the parking location model 302A using the location information corresponding to the parking location and the type label.

In the second embodiment, the DCM 100 stores the mode list for each type of the parking location. FIG. 11 is an example of the mode list 102A in the second embodiment. In the present example, different operation modes are defined for "home" and "office". In the present example, for example, the ECU 200 that coordinates with the smart home is put into a sleep state the office.

Figure 12:
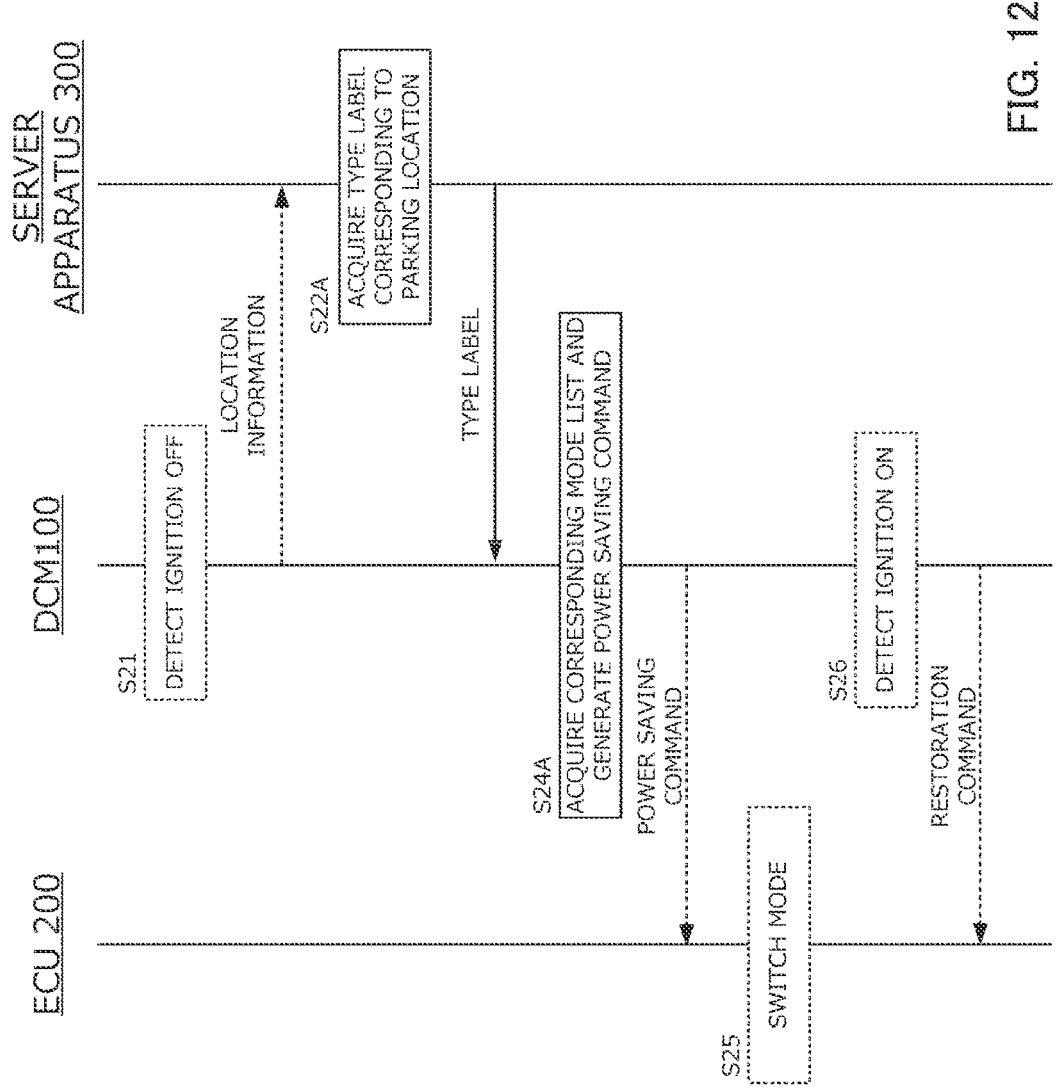
FIG. 12 is a flowchart of a second phase in the second embodiment.

FIG. 12 is a flowchart of a second phase in the second embodiment. Processing similar to the processing ii the first embodiment is indicated with dotted lines, and description thereof will be omitted.

In the present embodiment, in step S22A, the server apparatus 300 (classification unit 3012) acquires the type label corresponding to the parking location using the parking location model 302A. The acquired type label is transmitted to the DON 100.

In step S24A, the DOM 100 (power management unit 1014) acquires a list of operation modes corresponding to the type label and generates commands for the ECUs 200. For example, in the example in FIG. 11, in a case where a type of "office" is obtained, the DOM 100 generates a command for putting only the ECU 200D into a sleep state while the vehicle is parked. Note that in a case where a type corresponding to the parking location cannot be obtained, the plurality of ECUs 200 provided at, the vehicle 1 perform normal operation.

Subsequent processing is similar to the processing in the first embodiment.

As described above, in the second embodiment, the parking locations are classified into a plurality of classes using a predetermined criterion, and the operation modes of the ECUs 200 are designated for each of the classification results. This enables finer power saving control.

Note that the type label in the present embodiment may indicate whether or not there is a predetermined facility such as a charging facility. This enables operation of, for example, "causing the ECU 200 that manages charging to operate at a parking space having a charging facility".

Further, the type label may be based on whether or not there is a network infrastructure. This enables operation of, for example, "causing the ECU 200 that requires access to a network to operate at a parking space at which the predetermined network is accessible".

Further, the type label may be based on a wireless communication environment. For example, the server apparatus 300 may store an electric field strength map of a wireless signal to be utilized in mobile communication and may generate the type label based on the electric field strength for each parking location. This enables operation of, for example, preventing communication at a location where performance of mobile communication cannot be sufficiently exerted.

Third Embodiment

In the first to the second embodiments, the DON 100 stores the mode list created in advance. In contrast, a third embodiment is an embodiment in which the server apparatus 300 learns operation modes preferable for the ECUs 200 while the vehicle is parked based on past operation results of the plurality of ECUs 200 while the vehicle is parked.

In the third embodiment, the server apparatus 300 acquires the operation results of the plurality of ECUs 200 while the vehicle is parked every time the vehicle 1 is parked and learns a relationship between the parking locations and the operation modes preferable for the ECUs 200 through a machine learning model (which will be referred to as a power saving model).

Figure 13:
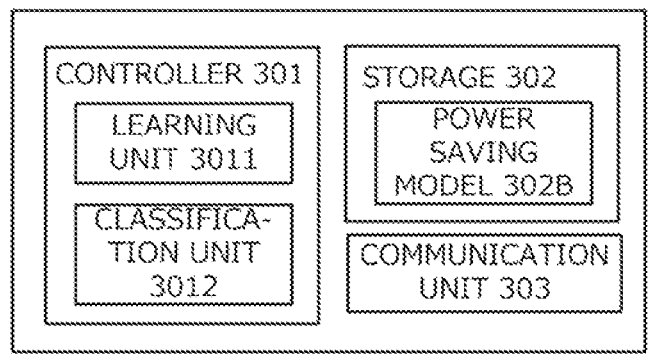
FIG. 13 is a schematic diagram of a server apparatus in a third embodiment.

In the third embodiment, the mode list 102A is not stored in the storage 102 of the DCM 100. Instead, a power saving model 302B is stored in the storage 302 of the server apparatus 300. FIG. 13 is a schematic diagram of the server apparatus 300 in the third embodiment.

In the third embodiment, the server apparatus 300 (learning unit 3011) learns the power saving model by acquiring data (operation result data) indicating the past operation results of the plurality of ECUs 200 at a predetermined parking location and determining the operation mode desirable for the corresponding ECU 200 based on the operation result data.

For example, the server apparatus 300 determines that "a certain ECU 200 requests communication but cannot utilize a mobile communication network" at a predetermined parking location based on information collected from the vehicle 1. At such a parking location, it is highly likely that the network cannot be utilized when the vehicle is parked next time and thereafter. Thus, the server apparatus 300 learns the power saving model such that the ECU is not caused to operate or a frequency of communication of the ECU 200 is decreased at the parking' location.

FIG. 14 is a diagram illustrating a relationship between operation result data for the plurality of ECUs 200 and operation modes desirable for the ECUs 200. For example, for a certain ECU 200, in a case where communication times out although a request for communication occurs while the vehicle is parked, it can be considered that there is a problem in a network environment at the parking location, and thus, it is determined that the ECU 200 should be put into a sleep state (or a frequency of communication is decreased) at the parking location. Conversely, in a case where a request for communication is issued, and communication is normally performed, it is determined that the ECU 200 should be caused to operate. By making such determination for each of the plurality of ECUs 200, a mode list that describes operation modes preferable for the plurality of ECUs 200 can be generated.

Further, the server apparatus 300 learns the power saving model 302B using the generated mode list. The power saving model 302B is a model that learns a relationship between the location information of the parking location and the mode FIGS. 15A and 15B are diagrams for explaining the power saving model in the third embodiment. In the present embodiment, the server apparatus 300 generates a mode list based on the operation result data and learns the power saving model 302B using the mode list. By this configuration, a machine learning model that receives input of location information of a parking location and outputs a mode list. (that is, a list of operation modes preferable for the plurality of ECUs 200) corresponding to the parking location, can be obtained.

Figure 16:
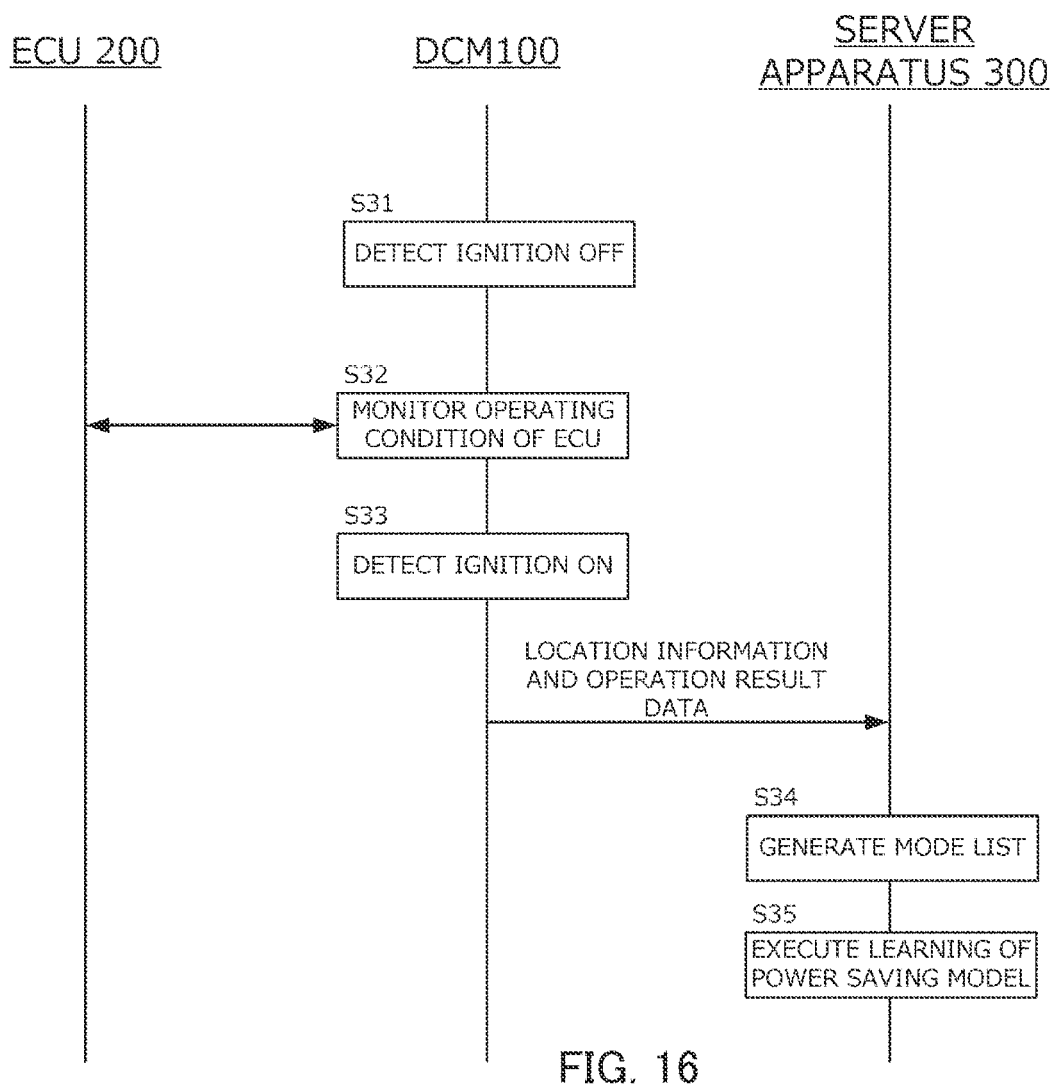
FIG. 16 is a flowchart of a first phase in the third embodiment.

FIG. 16 is a flowchart of the first phase in the third embodiment.

First, in step S31, the DCII 100 (power management unit. 1014) provided at the vehicle 1 detects that the ignition of the vehicle is turned off. In a case where the power management unit 1014 detects that the ignition of the vehicle is turned off, the power management unit 1014 starts monitoring of operating conditions of the plurality of ECUs 200 (step S32). Results of monitoring (operation logs and logs of communication) are accumulated in the storage 102 as needed while the vehicle is parked.

In step S33, the DCI'1 100 (power management unit. 1014) provided at the vehicle 1 detects that the ignition of the vehicle is turned on. In a case where the power management unit 1014 detects that the ignition of the vehicle is turned on, the power management unit 1014 stops monitoring of the ECUs 200. In the present step, the power management unit 1014 acquires location information via the UPS module 140 and transmits the acquired location information and data indicating the operating conditions of the ECUs 200 (operation resuat data) accumulated while the vehicle is parked to the server apparatus 300.

In step S34, the server apparatus 300 (learning unit 3011) generates a mode list based on the operation result data.

Then, in step S35, the server apparatus 300 executes learning of the power saving model 302B using the received location information and the generated mode list.

Figure 17:
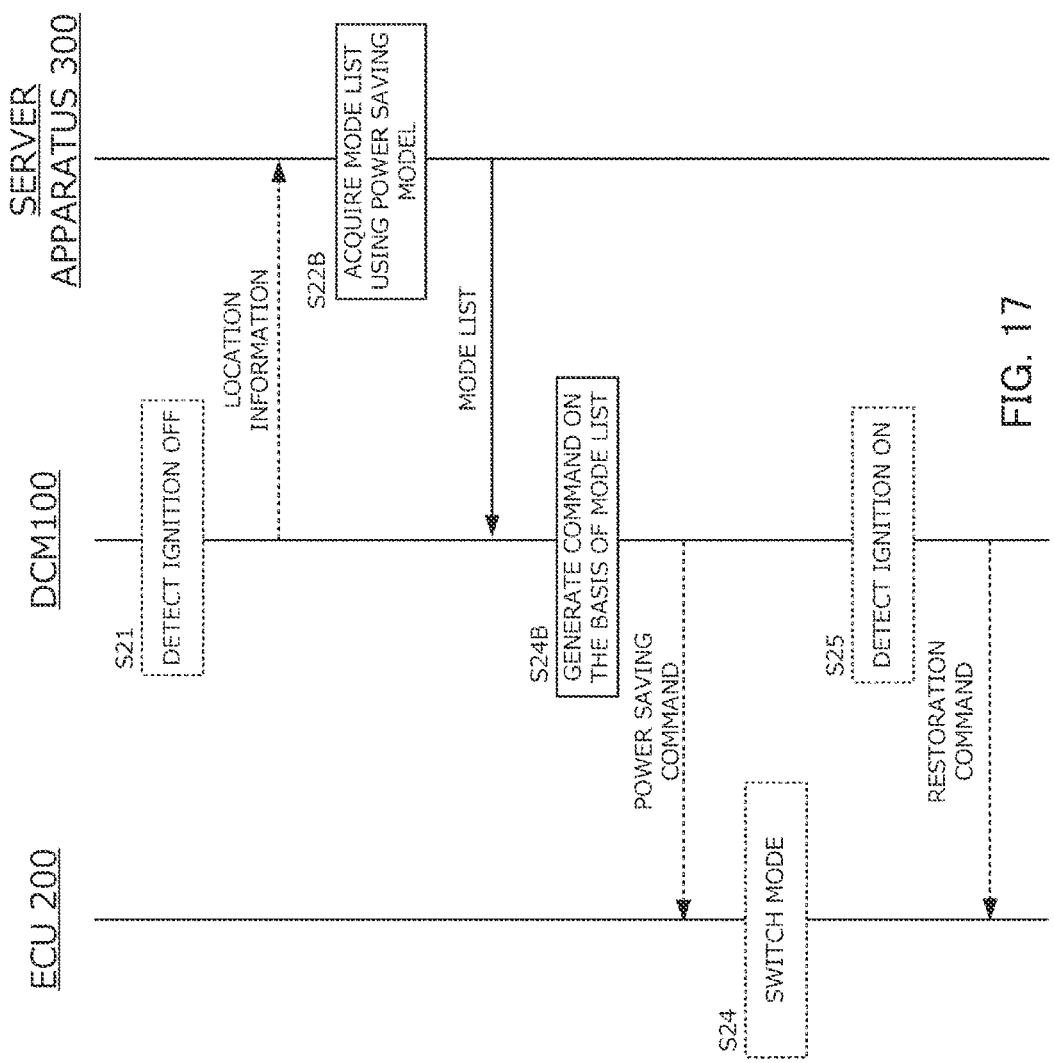
FIG. 17 is a flowchart of a second phase in the third embodiment.

FIG. 17 is a flowchart of the second phase in the third embodiment. Processing similar to the processing in the first embodiment is indicated with dotted lines, and description will be omitted.

In the present embodiment, in step S22B, the server apparatus 300 (classification unit 3012) acquires a mode list corresponding to the parking location using the power saving model 302B. The acquired mode list is transmitted to the DCI 100.

In step S24B, the DOM 100 (power management unit 1014) generates commands for the ECUs 200 based on the acquired mode list. For example, in a case of the example in FIG. 14, the DOM 100 generates commands for putting the ECUs 200A and 200B into a sleep state.

Subsequent processing is similar to the processing in the first embodiment.

As described above, in the third embodiment, the operation modes preferable for the ECUs 200 are learned for each of predetermined parking locations based on the operation results of the ECUs 200 while the vehicle is parked. By this configuration, the operation modes of the ECUs 200 can be determined without generating the mode list in advance, Note that while in the present embodiment, the power saving model 302B is learned using the mode list generated based on the operation result data as training data, the learning may be performed using the operation result data as the training data. In this case, in step S223, the mode list may be generated based on ah output of the power saving model 302B.

(Modified Examples)

The above-described embodiments are merely examples, and the present disclosure can be changed and implemented as appropriate within a scope not deviating from the gist of the present disclosure.

For example, the processing and the units described in the present disclosure can be freely combined and implemented unless technical inconsistency occurs.

Further, while in the first and the second embodiments, the server apparatus 300 classifies the parking locations, the processing may be completed by the DOM 100 without using the server apparatus 300.

Further, while in the description of the embodiments, the operation modes of the ECUs 200 are determined based on the parking location, the operation modes of the ECUs 200 may be determined using further conditions. For example, in a case where the parking location is a parking space where the vehicle 1 can be charged, conditions such as a condition that "a predetermined. ECU 200 is caused to operate in a case where the vehicle is being charged" and a condition that "the ECU is caused to be put into a sleep state in a case where the vehicle is not being charged" may be added.

In addition, the processing described as being performed by one device may be shared and executed by a plurality of devices. Alternatively, the processing described as being performed by different devices may be executed by one device. In a computer system, what hardware configuration (server configuration) realizes each function can be flexibly changed.

The present disclosure can also be realized by supplying a computer program including the functions described in the above embodiments to a computer and causing one or more processors included in the computer to read and execute the program. Such a computer program may be provided to the computer by a non-transitory computer-readable storage medium connectable to a system bus of the computer, or may be provided to the computer via a network. Examples of non-transitory computer readable storage media include: any type of disk such as a magnetic disk (floppy (registered trademark) disk, hard disk drive (HDD), etc.), an optical disk (CD-ROM, DVD disk, Blu-ray disk, etc.); and any type of medium suitable for storing electronic instructions such as read-only memory (ROM), random access memory (RAM), EPROM, EEPROM, magnetic cards, flash memory, and optical cards.

What is claimed is:

1. An information processing apparatus comprising a controller configured to:
    detect a shutdown operation, that is an operation of stopping a traveling system, is performed for a predetermined vehicle;
    obtain, via a global positioning system (GPS) module, location information of a first location that is a location at which the shutdown operation is performed, the GPS module being included in the vehicle;
    transmit the obtained location information of the first location and operation result data to a server apparatus, the operation result data being data in which the location information of the first location is associated with an operating condition about each of a plurality of electronic control units (ECUs) included in the vehicle;
transmit the location information of the first location where the shutdown operation was performed, after generating a mode list based on the transmitted operation result data by the server apparatus and learning of a machine learning model by the server apparatus, the mode list including preferable operation modes which identify whether each of the plurality of ECUs is in a normal mode or a sleep mode at the first location of the vehicle, and the machine learning model learning of a relationship between the transmitted location information of the first location and a preferable operating condition about each of the plurality of ECUs with the generated mode list as a learning model;
receive first data being output by using the machine learning model from the server apparatus, the first data corresponding to the location information of the first location where the shutdown operation is performed after learning of the machine learning model, the first data designating operation modes of the plurality of ECUs;
generate a command about an operation mode after the shutdown operation for at least one of the plurality of ECUs based on the received first data; and
transmit the generated command to the at least one of the plurality of ECUs to cause the at least one of the plurality of ECUs to change the operation mode according to the generated command.

2. The information processing apparatus according to claim 1, wherein
the operation mode is at least one of a first mode or a second mode in which an execution frequency or an execution period of processing is reduced compared to the first mode.

3. The information processing apparatus according to claim 1, wherein
the operation mode is at least one of a first mode in which operation is allowed or a second mode in which operation is prohibited, and the controller controls the at least one of the ECUs in the second mode to be in a sleep state.

4. A vehicle system comprising a vehicle and a server apparatus, wherein
the server apparatus comprises a first controller,
the vehicle comprises a second controller, wherein
the second controller is configured to:
 obtain, via a global positioning system (GPS) module, location information of a first location that is a location at which a shutdown operation, that is an operation of stopping a traveling system of the vehicle, is performed for the vehicle, the GPS module being included in the vehicle; and
 transmit the obtained location information of the first location and operation result data to the server apparatus, the operation result data being data in which the location information of the first location is associated with an operating condition about each of a plurality of electronic control units (ECUs) included in the vehicle;
the first controller configured to:
 receive the transmitted location information of the first location and the operation result data from the vehicle;
 generate a mode list based on the received operation result data, the mode list including preferable operation modes which identify whether each of the plurality of ECUs is in a normal mode or a sleep mode at the first location of the vehicle; and
 learn of a machine learning model which learns of a relationship between the received location information of the first location and a preferable operating condition for each of the plurality of ECUs with the generated mode list as a learning model; and
the second controller configured to transmit, to the server apparatus, the location information of the first location where the shutdown operation was performed after learning of the machine learning model by the server apparatus, and
the first controller configured to:
 receive the transmitted location information of the first location after learning of the machine learning model from the vehicle;
 based on the received location information of the first location, output, by using the machine learning model, first data that is data for determining an operation mode of each of the plurality of ECUs, the first data corresponding to the location information of the first location where the shutdown operation is performed after learning of the machine learning model, the first data designating operation modes of the plurality of ECUs; and
 transmit the output first data to the vehicle; and
the second controller is configured to
 receive the transmitted first data from the server apparatus;
 generate a command about an operation mode after the shutdown operation for at least one of the plurality of ECUs based on the received first data; and
 transmit the generated command to the at least one of the plurality of ECUs to cause the at least one of the plurality of ECUs to change the operation mode according to the generated command.

5. The vehicle system according to claim 4, wherein
the operation mode is at least one of a first mode or a second mode in which an execution frequency or an execution period of processing is reduced compared to the first mode.

6. The vehicle system according to claim 4, wherein
the operation mode is at least one of a first mode in which operation is allowed or a second mode in which operation is prohibited, and the second controller controls the at least one of the ECUs in the second mode to be in a sleep state.

7. An information processing method comprising:
detecting a shutdown operation, that is an operation of stopping a traveling system of a vehicle, is performed;
obtaining, via a global positioning system (GPS) module, location information of a first location that is a location at which the shutdown operation is performed, the GPS module being included in the vehicle;
transmitting the obtained location information of the first location and operation result data to a server apparatus, the operation result data being data in which the location information of the first location is associated with an operating condition about each of a plurality of electronic control units (ECUs) included in the vehicle;
transmitting the location information of the first location where the shutdown operation was performed, after generating a mode list based on the transmitted operation result data by the server apparatus and learning of a machine learning model by the server apparatus, the mode list including preferable operation modes which identify whether each of the plurality of ECUs is in a normal mode or a sleep mode at the first location of the vehicle, and the machine learning model learning of a relationship between the transmitted location information of the first location and a preferable operating condition about each of the plurality of ECUs with the generated mode list as a learning model;

receiving first data being output by using the machine learning model from the server apparatus, the first data corresponding to the location information of the first location where the shutdown operation is performed after learning of the machine learning model, the first data designating operation modes of the plurality of ECUs;

generating a command about an operation mode after the shutdown operation for at least one of the plurality of ECUs based on the received first data; and transmitting the generated command to the at least one of the plurality of ECUs to cause the at least one of the plurality of ECUs to change the operation mode according to the generated command.

8. A non-transitory computer readable storing medium recording a computer program for causing a computer to perform the information processing method according to claim 7.

* * * * *